No. 884,689.
PATENTED APR. 14, 1908.
J. TILLOTSON.
APPARATUS FOR COOLING MILK.
APPLICATION FILED JULY 2, 1907.
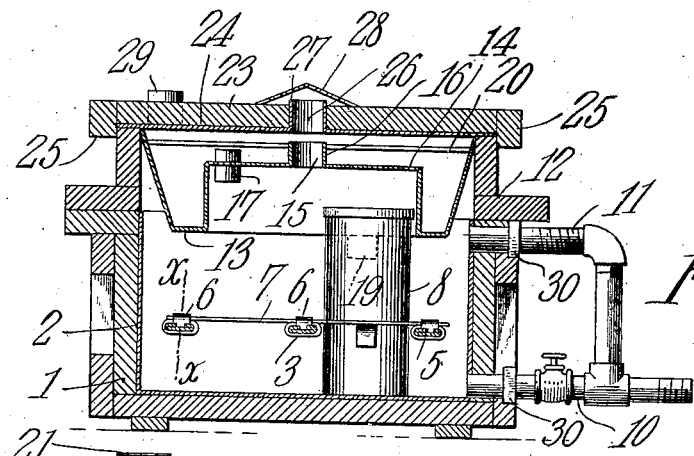
*Fig. 1.*
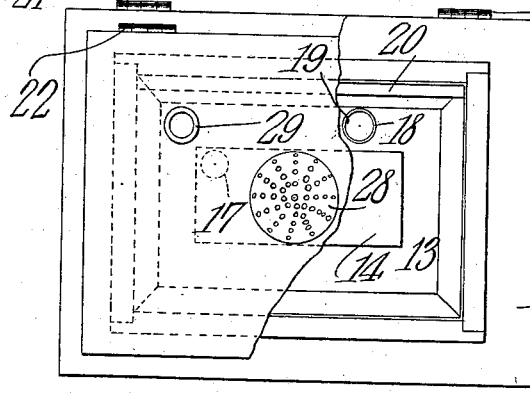
*Fig. 2.*
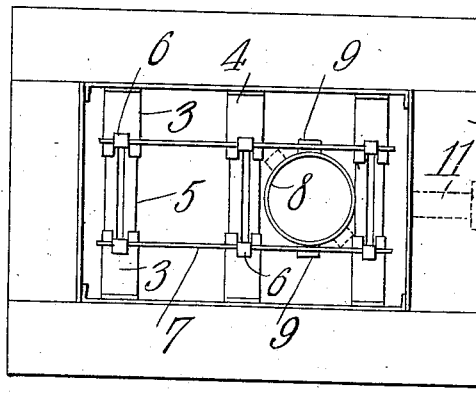
*Fig. 3.*
*Fig. 4.*
WITNESSES:
James Tillotson,
INVENTOR,
By C. A. Snow & Co.
ATTORNEYS

UNITED STATES PATENT OFFICE.

JAMES TILLOTSON, OF HEBRON, NEBRASKA.

APPARATUS FOR COOLING MILK.

No. 884,689.   Specification of Letters Patent.   Patented April 14, 1908.

Application filed July 2, 1907. Serial No. 381,840.

*To all whom it may concern:*

Be it known that I, JAMES TILLOTSON, a citizen of the United States, residing at Hebron, in the county of Thayer and State of Nebraska, have invented a new and useful Apparatus for Cooling Milk, of which the following is a specification.

This invention relates to apparatus for cooling milk and its object is to provide simple and efficient means whereby the animal heat contained within the milk can be quickly removed therefrom.

A still further object is to provide apparatus of this character utilizing flowing water as a cooling medium, the parts being so constructed that water can be disposed above and around the receptacles containing the milk without in any wise interfering with the ventilation of the milk or wasting any of the water utilized for cooling purposes.

A still further object is to provide simple and efficient means for holding cans within the apparatus to prevent displacement thereof.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a longitudinal section through the apparatus. Fig. 2 is a plan view thereof. Fig. 3 is a plan view of the tank of the apparatus, the covers being removed. Fig. 4 is an enlarged section on line x—x, Fig. 1.

Referring to the figures by characters of reference, 1 designates a tank preferably formed of wood and rectangular in outline, said tank having a lining 2 of metal or other suitable material. This lining may be constructed in any desired manner, the corners thereof being preferably reinforced by lapping the adjoining end portions of the walls of the lining and soldering or otherwise securing them together. This arrangement has been shown particularly in Fig. 3. Secured to the linings of the side walls are sleeves 3 arranged in pairs and substantially rectangular in cross section, each sleeve being provided with ears 4 which are riveted, soldered, or otherwise secured to the lining. The sleeves are arranged in pairs and extending into the sleeves of each pair are the opposite end portions of a bar 5 formed of sheet metal or of any other preferred material. An ear 6 is bent upward from each sleeve and these ears are designed to embrace retaining wires 7 extending transversely of the sleeves. Said ears may be soldered or otherwise fastened to the wires so as to positively hold them in position. The intersecting wires and cross bars form holders designed to receive milk receptacles such as cans 8 each can being provided with outstanding ears 9 designed to be swung into position beneath the wires so as to prevent withdrawal of the cans. These ears 9, however, are so proportioned that by partly turning the can, so as to bring the ears into position such as shown by dotted lines in Fig. 3, it can be readily raised. An outlet pipe 10 extends from the bottom portion of the tank 1 and an overflow pipe 11 extends from the upper portion of said tank and opens into the outlet pipe. This overflow pipe is disposed with its lower portion slightly below the top of the cans 8 so that it becomes possible for water to rise almost to the upper edge of the can before it passes out through the overflow pipe.

Hingedly connected to the top of the tank is a frame 12 in which is disposed a metallic tray 13 from the bottom of which extends a rectangular raised portion 14 spaced at equal distances from the walls of the tray and forming an air chamber thereunder. This upstanding portion is hollow and is designed to extend over the cans contained within the tank. An opening 15 is formed in the center of the top of the upstanding portion and is surrounded by a tubular extension 16. A short tube 17 extends downward through one corner of the top of the extension 14, the upper end of said tube being disposed in a plane slightly below the upper end of the tube 16. An aperture 18 is formed in the bottom of the tray and has a tube 19 extending downward therefrom. A guard strip 20 extends longitudinally along that wall of the tray 13 adjacent its hinges 21.

Hingedly connected to the frame 12, as shown at 22, is a cover 23 having a lining 24 of metal or other suitable material, said cover being preferably provided with depending flanges 25 designed to lap the walls of the frame 12, as shown in Fig. 1. An aperture 26 is formed in the center of said closure and has a metal tube 27 therein constituting a lining. This tube is designed to register with the tube 16 and extending over the tube 27 is a perforated conical plate 28 constituting a guard to prevent dirt, etc. from entering the opening 26. An inlet tube 29 extends through the closure and is preferably disposed to discharge liquid into the tray 13 at one corner thereof.

In using the apparatus herein described the cover or closure 23 and the frame 12 are swung upward after which cans 8 containing the milk to be cooled are inserted between the wires 7 and the bars 5, after which said cans are partly turned so as to bring the ears 9 into position beneath the wires. After the cans have been placed in this manner the frame 12 and the cover or closure 23 are lowered and water is admitted to the apparatus through the tube 29. From this tube it is discharged into the tray 13 in which it will rise and spread over the extension 14 and then flow outward through the tube 17. This tube will direct it into the tank 1 at one side of the cans or receptacles therein and the water will pass outward from this tank through the pipe 10. The level of the water can be raised almost to the upper edge of the cans before the water will be carried away through the overflow pipe 11. By producing a continuous flow of water through the apparatus the milk can be quickly cooled and as the openings 15 and 26 register it is apparent that a thorough ventilation is obtained and objectionable gases are free to escape from the apparatus during the cooling operation. Importance is attached to the fact that the cans within the tank are not only completely surrounded by the cooling liquid but a body of said liquid is supported above the cans without, however, interfering with the proper ventilation of the apparatus.

In order that the pipes 10 and 11 may be securely fastened to the casing 1 each of said pipes preferably has a nut 30 screwed thereon and fitting snugly within a recess within the casing and secured in said recess in any suitable manner.

What is claimed is:

1. In an apparatus of the character described the combination with a tank having communicating drain and overflow outlets, and holding means within the tank; of a frame movably connected to the tank, a tray supported therein and having an air chamber in the bottom thereof, said tray being disposed to hold a cooling medium and to discharge it into the tank, a longitudinally disposed guard strip within the tray, a closure connected to the tray, said closure and the tray having registering ventilating openings, a guard located above said openings, and means for directing a cooling medium through the closure.

2. In an apparatus of the character described the combination with a tank, a tray therein and a closure; of means for holding receptacles within the tank and below the tray, said means comprising oppositely disposed angular sleeves, each sleeve having a folded portion constituting a retaining ear, cross bars having their ends seated in the sleeves, and retaining wires disposed perpendicularly to the cross bars and engaged and held by the ears.

In testimony that I claim the foregoing as my own, I have hereto affixed my signature in the presence of two witnesses.

JAMES TILLOTSON.

Witnesses:
J. M. COTTRELL,
W. E. GOODHUE.